May 19, 1970     S. P. DONAKOWSKI     3,512,755
DEVICE FOR PULLING SKIDS
Filed Aug. 5, 1968
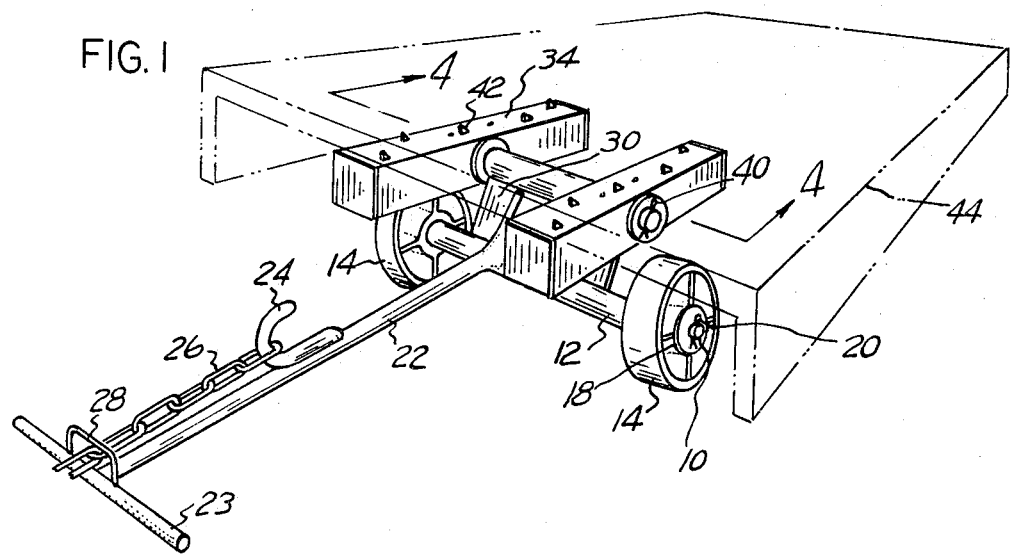
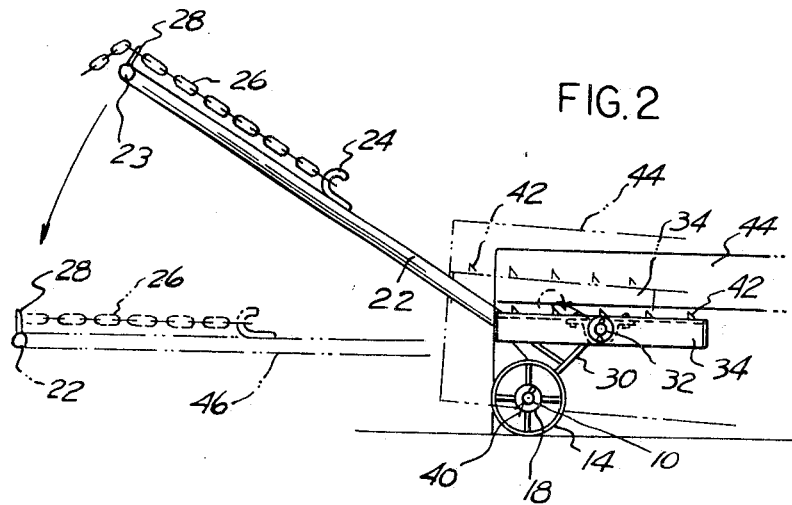
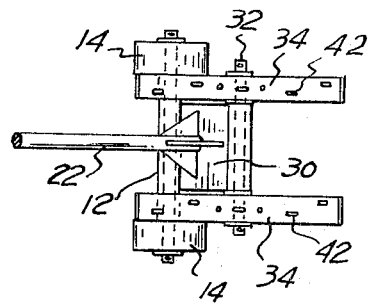
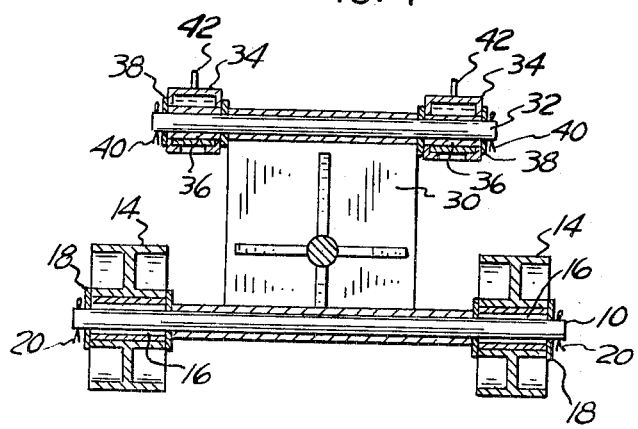
INVENTOR
STEPHEN P. DONAKOWSKI
BY *Adolph G. Martin*
ATTORNEY

United States Patent Office 3,512,755
Patented May 19, 1970

---

3,512,755
DEVICE FOR PULLING SKIDS
Stephen P. Donakowski, 7430 St. John,
Detroit, Mich. 48210
Filed Aug. 5, 1968, Ser. No. 750,446
Int. Cl. B60p 9/00
U.S. Cl. 254—8                           4 Claims

ABSTRACT OF THE DISCLOSURE

A wheeled device for use on loading docks and in warehouses and storage depots to elevate and holdably engage one end of a skid or pallet so that it may be conveniently pulled either manually or by mechanical means.

BACKGROUND OF THE INVENTION

This invention relates generally to devices for use in moving freight, cargo and other loads carried on skids and pallets. Fork lift trucks and various other similar types of carriers are commonly used for this purpose. Such devices, however, have never proven completely satisfactory because of their high initial cost, weight and excessive maintenance requirements.

SUMMARY OF THE INVENTION

This invention comprises a wheeled axle 10 attached to a tongue 22 having thereon a hook 24 for securing a tow chain 26. Two elongated members 34 are pivotally mounted on a shaft 32 supported by the wheeled axle 10. A staggered array of teeth 42 are provided on the upper face of each elongated member 34 for holdably engaging the under side of a skid 44.

BRIEF DESCRIPTION OF THE DRAWING

FIG. 1 is a perspective view showing the applicant's device in pulling engagement with a skid 44 shown in outline.

FIG. 2 is a side elevation view of the device under a skid 44, with a portion of the skid 44 broken away, showing the device with the tongue 22 in both a raised and a lowered position.

FIG. 3 is a top plan view of the device, with the tongue 22 in a lowered position, showing structural details of the various components.

FIG. 4 is a section view, taken substantially on plane 4—4 in FIG. 1, showing structural details of the housing 12, and the support 30 for the shaft 32.

For a more detailed description of the invention, reference is made to the drawings in which numeral 10 designates an axle supported in a housing 12. A wheel 14, having a central bearing 16, is mounted on each end of the axle 10, and removably retained thereon by a washer 18 and a pin 20. A tongue 22 on the housing 12 has a terminal handle 23, and an upwardly disposed hook 24 for attaching a towing chain 26 held in position by a guide 28.

An upwardly extending support 30 is provided on the housing 12 angularly disposed to the tongue 22. A shaft 32 is mounted on the support 30 in a parallel relationship to the axle 10. An elongated member 34 is pivotally supported on each end of the shaft 32 by a bearing 36. A washer 38 and pin 40 removably holds the elongated members 34 on the shaft 32. A staggered array of upstanding teeth 42 are fixed on the upper face of each elongated member 34 for holdably engaging the platform of a skid 44.

The preceding discussion completes a description of the structural detatils of the disclosed embodiment of the applicant's invention; however, to comprehend more fully the subject matter herein presented, a discussion is next directed to the manner in which the device is employed to fulfill its purpose and perform its intended function.

USE AND OPERATION

In use, the device is wheeled to the front end of a skid 44, and the tongue 22 raised to the full line position shown in FIG. 2 so as to lower the elongated members 34. The device is then placed under the skid 44, and the tongue 22 lowered to the broken line position 46, so that the teeth 42 holdably engage the platform of the skid 44 thereby elevating one end as shown in FIGS. 1 and 2.

The tow chain 26 can then be attached to a tractor or other mechanical device, and the skid 44 pulled to any desired location. The chain 26 is then disconnected, and the tongue 22 again elevated so as to lower the elongated members 34. The teeth 42 are thereby disengaged from the platform of the skid 44 so that the device can be conveniently removed and wheeled to another location.

Based upon the foregoing discussion, the applicant is of the opinion that his invention has fulfilled a long-felt need in the field of skid pullers, and that he has made a valuable and significant contribution to the related art. However, while the invention was described with reference to the structural details of a single embodiment, the principles involved are susceptible of numerous other practical adaptations.

Therefore, I claim as new and desire to secure by Letters Patent:

1. A device for pulling skids comprising a wheeled axle, a tongue on the wheeled axle, a support on the wheeled axle angularly disposed to the tongue, a plurality of pivoted members on the support, and teeth on an upper surface of said pivoted members for holdably engaging a skid when the device is placed under one end thereof and the tongue lowered so as to elevate the pivoted members.

2. The device of claim 1 in which the pivoted members are transversely disposed to the wheeled axle.

3. The device of claim 2 in which the pivoted members are disposed to each other in a parallel relationship.

4. The device of claim 3 having in addition thereto means on the tongue for detachably engaging a towing member.

References Cited

FOREIGN PATENTS 532,861  1/1941  Great Britain.
704,999  3/1954  Great Britain.

BENJAMIN HERSH, Primary Examiner
J. A. PEKAR, Assistant Examiner

U.S. Cl. X.R.
214—372; 254—131; 280—47.24